United States Patent
Chen (10) Patent No.: US 11,715,377 B2
(45) Date of Patent: Aug. 1, 2023

(54) SAFE PASSING SYSTEM AND METHOD FOR VEHICLE

(71) Applicants: ZHEJIANG GEELY AUTOMOBILE RESEARCH INSTITUTE CO., LTD., Zhejiang (CN); GEELY HOLDING GROUP CO., LTD., Zhejiang (CN)

(72) Inventor: Wenlin Chen, Zhejiang (CN)

(73) Assignees: ZHEJIANG GEELY AUTOMOBILE RESEARCH INSTITUTE CO., LTD., Ningbo (CN); GEELY HOLDING GROUP CO., LTD., Hangzhou (CN)

( * ) Notice: Subject to any disclaimer, the term of this patent is extended or adjusted under 35 U.S.C. 154(b) by 329 days.

(21) Appl. No.: 17/004,266

(22) Filed: Aug. 27, 2020

(65) Prior Publication Data

US 2020/0394918 A1    Dec. 17, 2020

Related U.S. Application Data

(63) Continuation-in-part of application No. PCT/CN2018/094542, filed on Jul. 4, 2018.

(30) Foreign Application Priority Data

Feb. 27, 2018    (CN) .......................... 201810162820.9

(51) Int. Cl.
  *G08G 1/16*    (2006.01)
  *H04W 4/40*    (2018.01)
  (Continued)

(52) U.S. Cl.
  CPC ......... *G08G 1/164* (2013.01); *B60W 30/0956* (2013.01); *B60W 30/18163* (2013.01);
  (Continued)

(58) Field of Classification Search
  CPC ........ G08G 1/164; G08G 1/165; G08G 1/166; H04W 4/40; B60W 30/0956;
  (Continued)

(56) References Cited

U.S. PATENT DOCUMENTS

2007/0005609 A1 *   1/2007   Breed .................... B60W 50/00
2018/0326977 A1 *  11/2018   Klarner ................. B60W 30/09
(Continued)

FOREIGN PATENT DOCUMENTS

CN    101286266 A   * 10/2008
CN    103606270 A      2/2014
(Continued)

OTHER PUBLICATIONS

Machine Translation of Han's reference (Year: 2008).*
International Search Report of PCT Patent Application No. PCT/CN2018/094542 dated Sep. 18, 2018.

*Primary Examiner* — Tarek Elarabi (57) ABSTRACT

A safe passing system for a vehicle includes: a road ambient environment sensing system (101), configured to obtain sensing information of a road ambient environment in real time, process the sensing information to obtain vehicle driving assistance information, and send the vehicle driving assistance information to a vehicle-mounted terminal (102); and the vehicle-mounted terminal (102), configured to receive the vehicle driving assistance information, and plan a driving route according to the vehicle driving assistance information and vehicle-acquired information.

10 Claims, 4 Drawing Sheets

(51) Int. Cl.
  *B60W 30/095*  (2012.01)
  *B60W 30/18*   (2012.01)
  *G01C 21/34*   (2006.01)

(52) U.S. Cl.
  CPC ......... *G01C 21/3407* (2013.01); *G08G 1/165* (2013.01); *G08G 1/166* (2013.01); *H04W 4/40* (2018.02); *B60W 2552/00* (2020.02); *B60W 2554/404* (2020.02); *B60W 2554/4029* (2020.02)

(58) Field of Classification Search
  CPC ....... B60W 30/18163; B60W 2552/00; B60W 2554/4029; G01C 21/3407
  See application file for complete search history.

(56) References Cited

U.S. PATENT DOCUMENTS

2019/0056743 A1* 2/2019 Alesiani ............... G01C 21/005
2019/0080607 A1* 3/2019 McClain ................ G08G 1/166

FOREIGN PATENT DOCUMENTS

CN     107274695 A      10/2017
WO     WO-2017197284 A1 * 11/2017 ............. G08G 1/005

* cited by examiner

Vehicle-mounted terminal 102

Vehicle-mounted V2X module 102a

Vehicle-mounted control system 102b

FIG. 5

A road ambient environment sensing system obtains sensing information of a road ambient environment in real time, processes the sensing information of the road ambient environment to obtain vehicle driving assistance information, and sends the vehicle driving assistance information to a vehicle-mounted terminal — S201

The vehicle-mounted terminal receives the vehicle driving assistance information, and plans a driving route according the vehicle driving assistance information and vehicle-acquired information — S202

FIG. 6

SAFE PASSING SYSTEM AND METHOD FOR VEHICLE

CROSS-REFERENCE TO RELATED APPLICATIONS

The present application is a Continuation-in-part Application of PCT application No. PCT/CN2018/094542 filed on Jul. 4, 2018, which claims the benefit of Chinese Patent Application No. 201810162820.9 filed on Feb. 27, 2018, the contents of the above are hereby incorporated by reference.

TECHNICAL FIELD

The present invention relates to the field of intelligent transportation technologies, and in particular, to a safe passing system and method for a vehicle.

BACKGROUND

Vehicle Infrastructure Integration (V2I) is a system that obtains vehicle and road information based on technologies such as wireless communications and sensing, and implements intelligent integration between vehicles and infrastructure through inter-vehicle and vehicle-road information interaction and sharing.

With the development of technologies and improvement of laws and regulations, it is foreseeable that all new vehicles in the future will be installed with Vehicle-to-Everything (V2X) devices. However, in a long period of transition, not all road traffic participants carry V2X devices, for example, pedestrians, bikers, and vehicles without V2X devices. In this period, it is more important to develop V2I, to incorporate traffic participants without V2X devices into the Internet of vehicles by building roadside infrastructure, so that a road ambient environment sensing system can obtain information of various participants on roads as a part of the V2I to form a link of the whole intelligent networking. In most existing V2I technologies, information sent by built-in V2X devices of vehicles is acquired, while information acquisition of pedestrians, bikers and vehicles without V2X devices is not involved in data processing.

SUMMARY

To solve the problem in the prior art, the present invention provides a safe passing system for a vehicle. The system can incorporate information acquisition of various road participants on roads, including pedestrians, bikers and vehicles that do not carry V2X devices, into the Internet of vehicles. The specific technical solution is as follows:

A safe passing system for a vehicle, including the following system/module:

a road ambient environment sensing system, configured to obtain sensing information of a road ambient environment in real time, process the sensing information to obtain vehicle driving assistance information, and send the vehicle driving assistance information to a vehicle-mounted terminal; and the vehicle-mounted terminal, configured to receive the vehicle driving assistance information, and plan a driving route according to the vehicle driving assistance information and vehicle-acquired information.

Further, the road ambient environment sensing system includes:

a scanning and sensing module, configured to scan the road ambient environment by using one or more types of scanning devices, and send the sensing information obtained through scanning to a data processing module, where the scanning and sensing module includes one or more types of scanning devices and a wireless communication module, the scanning device is connected to the wireless communication module through communication, and the wireless communication module is connected to the data processing module through wireless communication;

the data processing module, configured to process the sensing information to obtain the vehicle driving assistance information, and send the vehicle driving assistance information to a roadside V2X module, where the data processing module includes a wireless communication module and a processor; and the roadside V2X module, configured to send the vehicle driving assistance information to a vehicle-mounted terminal on a vehicle that is passing and/or is going to run through the current road, where the roadside V2X module includes a sensor, a processor, a Road Side Unit (RSU), and an antenna, and the RSU includes a transmitter and a read/write controller.

Further, the data processing module is integrated on the roadside V2X module or the scanning and sensing module.

Further, the scanning device is selected from the group consisting of a laser radar, an over-the-horizon radar, a microwave radar, a millimeter-wave radar, an infrared device, a camera and combinations thereof; and the scanning device is mounted on one or more of a signal light stand, a street light pole, a traffic sign stand, a billboard stand, and a roadside building.

Further, the road ambient environment sensing system includes a cloud server;

the data processing module is further configured to send a data processing request to the cloud server, and receive the vehicle driving assistance information fed back by the cloud server; and the cloud server is configured to receive the data processing request sent by the data processing module, process the sensing information according to the data processing request to obtain the vehicle driving assistance information, and feed the vehicle driving assistance information back to the data processing module.

Further, the vehicle-mounted terminal includes:

a vehicle-mounted V2X module, configured to receive the vehicle driving assistance information and send the vehicle driving assistance information to a vehicle-mounted control system, where the vehicle-mounted V2X module includes an On Board Unit (OBU), a processor, and an antenna, and the OBU includes a microprocessor, a non-volatile memory, and a radio frequency front-end; and the vehicle-mounted control system, including a communication unit, one or more processors, a memory, and one or more computer programs, where the communication unit is configured to receive the vehicle driving assistance information and the vehicle-acquired information, and the one or more computer programs, stored in the memory and configured to be executed by the one or more processors, are configured to plan the driving route according to the vehicle driving assistance information and the vehicle-acquired information.

Further, the road ambient environment includes all perceivable traffic elements that affect road traffic safety, and the traffic elements include pedestrians, vehicles, roads, road ancillary facilities and obstacles; and the vehicle driving assistance information includes attribute information and vector information of the traffic elements, and the vector information includes a speed, an acceleration, and a predicted motion track.

In addition, the present invention further provides a safe passing method for a vehicle. The specific technical solution is as follows:

A safe passing method for a vehicle based on the foregoing safe passing system for a vehicle, including:

obtaining, by a road ambient environment sensing system, sensing information of a road ambient environment in real time, processing the sensing information of the road ambient environment to obtain vehicle driving assistance information, and sending the vehicle driving assistance information to a vehicle-mounted terminal; and receiving, by the vehicle-mounted terminal, the vehicle driving assistance information, and planning a driving route according to the vehicle driving assistance information and vehicle-acquired information.

Further, the obtaining, by a road ambient environment sensing system, sensing information of a road ambient environment in real time, processing the sensing information of the road ambient environment to obtain vehicle driving assistance information, and sending the vehicle driving assistance information to a vehicle-mounted terminal includes:

scanning, by a scanning and sensing module, the road ambient environment by using one or more types of scanning devices, and sending the sensing information obtained through scanning to a data processing module, where the scanning and sensing module includes one or more types of scanning devices and a wireless communication module, the scanning device is connected to the wireless communication module through communication, and the wireless communication module is connected to the data processing module through wireless communication;

processing, by the data processing module, the sensing information to obtain the vehicle driving assistance information, and sending the vehicle driving assistance information to a roadside V2X module, where the data processing module includes a wireless communication module and a processor; and sending, by the roadside V2X module, the vehicle driving assistance information to a vehicle-mounted terminal on a vehicle that is passing and/or is going to run through the current road, where the roadside V2X module includes a sensor, a processor, an RSU, and an antenna, and the RSU includes a transmitter and a read/write controller.

Further, the processing, by the data processing module, the sensing information to obtain the vehicle driving assistance information includes:

sending, by the data processing module, a data processing request to a cloud server;

receiving, by the cloud server, the data processing request sent by the data processing module, processing the sensing information according to the data processing request to obtain the vehicle driving assistance information, and feeding the vehicle driving assistance information back to the data processing module; and receiving, by the data processing module, the vehicle driving assistance information fed back by the cloud server.

Further, the receiving, by the vehicle-mounted terminal, the vehicle driving assistance information, and planning a driving route according to the vehicle driving assistance information and vehicle-acquired information includes:

receiving, by a vehicle-mounted V2X module, the vehicle driving assistance information and sending the vehicle driving assistance information to a vehicle-mounted control system, where the vehicle-mounted V2X module includes an OBU, a processor, and an antenna, and the OBU includes a microprocessor, a non-volatile memory, and a radio frequency front-end; and planning, by the vehicle-mounted control system, the driving route according to the vehicle driving assistance information and the vehicle-acquired information, where the vehicle-mounted control system includes a communication unit, one or more processors, a memory, and one or more computer programs, the communication unit is configured to receive the vehicle driving assistance information and the vehicle-acquired information, and the one or more computer programs, stored in the memory and configured to be executed by the one or more processors, are configured to plan the driving route according to the vehicle driving assistance information and the vehicle-acquired information.

The present invention further provides a non-transitory computer-readable storage medium, wherein the computer-readable storage medium is used to store executable instructions, which can be loaded and executed by a processor to implement the safe passing method for a vehicle.

The present invention achieves the following beneficial effects:

1. In the present invention, objects obtained by scanning not only include traffic participants equipped with V2X devices, but also include traffic participants without V2X devices, such as pedestrians, bikers, road obstacles, road conditions, traffic lights and other traffic elements. The obtained sensing information of the road environment covers comprehensive content. The data has higher usability and can provide sufficient environment information of roads nearby for vehicles having V2X receiving apparatuses, so that routes are planned more safely, thereby fully protecting the right of way and safety of vulnerable road users (VRU).

2. One or more types of acquisition devices are used in the present invention, so that a suitable acquisition device can be selected according to a scanning range. Moreover, multiple types of acquisition devices may be used simultaneously to obtain traffic information of a real-time road environment in a larger range. Big data obtained by scanning in the present invention is real and accurate, and has low latency. The whole system is more robust, safer, and more reliable.

3. In the present invention, vehicles having V2X receiving apparatuses can receive environment information of roads nearby sent by the road ambient environment sensing system, thereby reducing the configuration requirement on built-in acquisition apparatuses of the vehicles.

4. The present invention may be applied to crossroads, accident black spots, and congested roads to disperse traffic effectively, thereby improving the passing efficiency and reducing traffic accidents.

Additional aspects and advantages of the present invention will be partly provided in the following description, and partly become evident in the following description or understood through the practice of the present invention.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

In order to make the objectives, technical solutions and advantages of the embodiments of the present invention clearer, the following clearly and completely describes the technical solutions in the embodiments of the present invention with reference to accompanying drawings in the embodiments of the present invention. Apparently, the described embodiments are some rather than all of the embodiments. All other embodiments obtained by a person of ordinary skill in the art based on the embodiments of the present invention without creative efforts shall fall within the protection scope of the present invention. The reference numerals of the embodiments are shown in the accompanying drawings. The same or similar numerals represent the same or similar elements (with the same or similar functions) throughout the specification.

V2X, short for Vehicle-to-Everything, means Vehicle to X, where X may be infrastructure, a vehicle, a road, the Internet, and the like, or may be any possible "person or object" (everything). V2X, as a wireless technology mainly for improving road safety and traffic management, is a key technology in an intelligent transportation system (ITS), and can implement communication between vehicles, between a vehicle and roadside infrastructure, and between a vehicle and the Internet, thereby obtaining a series of traffic information such as real-time road conditions, road information, and pedestrian information, improving driving safety, reducing congestion, and improving traffic efficiency.

Embodiment 1

A safe passing system for a vehicle provided in this embodiment is mainly applied to crossroads, accident black spots, congested roads and the like to disperse traffic effectively, thereby improving the passing efficiency and reducing traffic accidents. Definitely, the system may also be applied to any location on the road.

Figure 1:
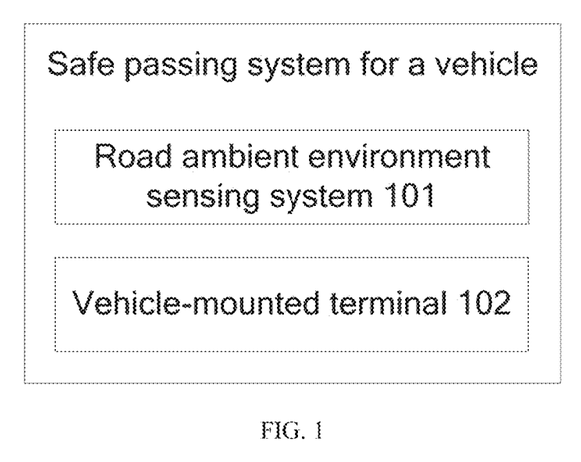
FIG. 1 is a structural block diagram of a safe passing system for a vehicle according to an embodiment of the present invention.

FIG. 1 is a schematic structural diagram of a safe passing system for a vehicle according to an embodiment of the present invention. To simplify the drawing, only systems/modules related to the subject of the specification are shown. The whole safe passing system for a vehicle may include many other structures and may use many other types of devices. As shown in FIG. 1, a safe passing system for a vehicle provided in this embodiment includes the following system/module:

a road ambient environment sensing system 101, configured to obtain sensing information of a road ambient environment in real time, process the sensing information to obtain vehicle driving assistance information, and send the vehicle driving assistance information to a vehicle-mounted terminal 102; and the vehicle-mounted terminal 102, configured to receive vehicle driving assistance information, and plan a driving route according the vehicle driving assistance information and vehicle-acquired information.

Specifically, the road ambient environment includes all perceivable traffic elements that affect road traffic safety, and the traffic elements include pedestrians, vehicles, roads, road ancillary facilities and obstacles.

To be specific, the traffic elements acquired by the road ambient environment sensing system 101 include, but are not limited to, a motor vehicle, a non-motor vehicle, a pedestrian, a biker, a road obstacle, a traffic light, a traffic sign, and the like.

Figure 2:
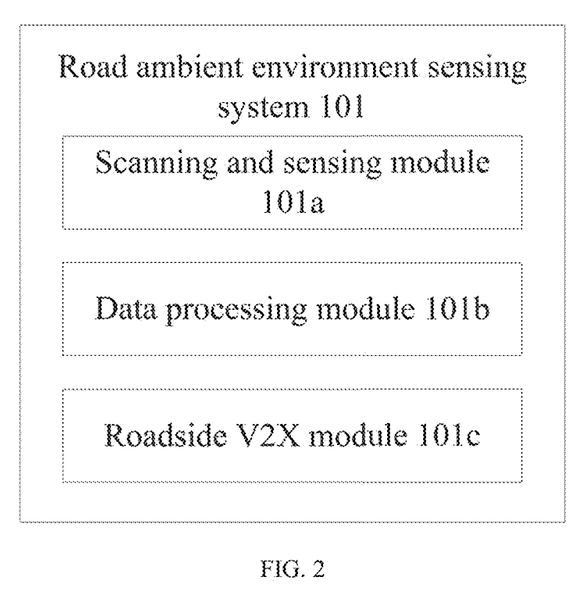
FIG. 2 is a structural block diagram of a road ambient environment sensing system according to an embodiment of the present invention.

FIG. 2 is a structural block diagram of a road ambient environment sensing system according to an embodiment of the present invention. As shown in FIG. 2, the road ambient environment sensing system 101 includes:

a scanning and sensing module 101a, configured to scan the road ambient environment by using one or more types of scanning devices, and send the sensing information obtained through scanning to a data processing module 101b, where the scanning and sensing module includes one or more types of scanning devices and a wireless communication module, the scanning device is connected to the wireless communication module through communication, and the wireless communication module is connected to the data processing module through wireless communication.

Specifically, the scanning device may be a laser radar, an over-the-horizon radar, a microwave radar, a millimeter-wave radar, an infrared device, a camera, a combination thereof, or other types of scanning devices. The wireless communication module includes one or more of a WIFI transmission module, a Bluetooth transmission module, a Zigbee transmission module, or a radio frequency (RF) transmission module.

It should be noted that, different scanning devices have different sensing ranges. In practical use, a distance from the scanning and sensing module 101a to a to-be-scanned road ambient environment does not exceed a scanning radius of the scanning and sensing module 101a. Therefore, according to requirements on the sensing range, effect, costs and the like, a scanning device with performance parameters meeting the requirements may be selected. For example, a scanning device with a relatively small scanning radius may be selected for a small crossroad on a low-grade road; and a scanning device with a relatively large scanning radius should be selected for a large crossroad on a high-grade road.

Different scanning devices have different performance when implementing the same function. For example, in terms of obstacle recognition, the camera can easily classify obstacles into detailed categories through deep learning, while the laser radar can only classify obstacles into general categories. The laser radar is advantageous in determining a motion state of an object. Moreover, the determining of the motion state of the object mainly relies on the laser radar. For example, the advantages of the camera are low costs and the relatively mature technology. The camera has the following disadvantages: first, it is extremely difficult to obtain accurate three-dimensional information (it is almost impossible for a monocular camera and technically difficult for a binocular or trinocular camera); another disadvantage is that the camera is greatly restricted by ambient light. The advantages of the laser radar are a long detection range and a 360-degree horizontal visual field. The laser radar can obtain three-dimensional information of an object accurately. In addition, the laser radar is highly stable and robust. The disadvantage of the laser radar lies in high costs. Therefore, the scanning and sensing module 101a may scan the road ambient environment by using multiple types of scanning devices (for example, using the camera and the laser radar simultaneously).

For example, in an embodiment, the scanning device used in the system is a terrestrial 3D laser scanning system. The terrestrial 3d laser scanning system consists of a laser scanner (with a scanning radius not less than 300 m) integrated with a built-in or an external image acquisition apparatus, as well as a matching software control system and a power supply. The terrestrial 3d laser scanning system can operate in coordination with GPS. Point cloud data obtained by scanning may be directly used for 3D modeling, and the camera is used for providing texture information and entity edge information that correspond to the point cloud data.

It should be noted that the terrestrial 3d laser scanning system can still work normally and stably in bad weather, for example, in cloudy, rainy and snowy weather. Affected by an external light source, shadow and a solar altitude in cloudy and rainy weather and at night, the video/image scanning/acquisition device cannot work stably, while the terrestrial 3D laser scanning system is not affected by the foregoing interference factors. In addition, a high-quality image formed by scanning may further be used for processing and analyzing a scene of an accident.

Specifically, the scanning device may be disposed on a signal light stand and/or a street light pole and/or a traffic sign stand and/or a billboard stand and/or a roadside building.

Alternatively, the scanning device is disposed on the road in a hidden manner.

Specifically, the scanning radius of the scanning device is not less than 150 m, or the scanning radius of the scanning device is 50-150 m.

It should be noted that the performance and latency of a sensor device directly affects the range, precision, and real-time performance of the sensing information, as well as the robustness of the entire safe passing system for a vehicle.

The data processing module 101b is configured to process the sensing information to obtain vehicle driving assistance information, and send the vehicle driving assistance information to a roadside V2X module 101c. The data processing module includes a wireless communication module and a processor. The wireless transmission module includes one or more of a WIFI transmission module, a Bluetooth transmission module, a Zigbee transmission module, or an RF transmission module. The processor may be one or more of a central processing unit, a microprocessor, a single-chip microprocessor or a microcomputer.

Specifically, the data processing module 101b is capable of processing the sensing information obtained through scanning. Information such as an object speed obtained by scanning is vectorized, to determine an attribute of the object and predict a motion track of the object. Then, such information is sent to the roadside V2X module 101c.

Optionally, the data processing module 101b includes a data fusion module, configured to perform different levels of related processing, such as fusion and filtering, on the sensing information obtained through scanning using multiple scanning devices or multiple types of scanning devices, to obtain information that cannot be obtained by one scanning device or one type of scanning device.

In an embodiment, the scanning devices include a millimeter-wave radar and an infrared camera. Azimuth information of the road ambient environment is obtained by the millimeter-wave radar, and temperature information of the road ambient environment is obtained by the infrared camera. Measurements of the azimuth information and the temperature information are fused, then filtering is performed after dimension expansion with distance information, and a good fusion result is obtained after measurement dimensions are reduced.

In an embodiment, the scanning devices include a radar and a camera. Three-dimensional space information within a scanning range is obtained according to local three-dimensional information in a video image obtained by the camera. A region of interest (ROI) is selected, the ROI is expanded through interpolation, and obstacle/target detection is performed on the expanded regional image. If an obstacle/target is detected, the obstacle/target is labeled with three-dimensional information, and the detection result is sent to the radar module for confirmation. It is determined whether the obstacle/target is also detected in sensing data formed by scanning by the radar, to obtain a good fusion result.

In an embodiment, the scanning devices include a laser radar and a video detection device. Resolving is performed according to point cloud data formed by scanning by the laser radar, and datum conversion is performed on the data of the laser radar, to obtain laser radar data in a result coordinate datum, so that the point cloud data precisely matches an image formed by scanning by the video detection device. On the basis of data fusion, contour information of a target object in the road ambient environment may be obtained according to intensity information of the point cloud data; and/or contour line features are extracted using a method of projecting three-dimensional point could data to a two-dimensional plane, to obtain a good fusion result.

Specifically, predicting the motion track of the object means detecting a target on each frame of image and point cloud data, and predicting a track of the motion target with reference to detection results of other temporally-correlated frames, so as to plan a task and motion.

The roadside V2X module 101c is configured to send the vehicle driving assistance information to the vehicle-mounted terminal 102 on a vehicle that is passing and/or is going to enter a current road. The roadside V2X module includes a sensor, a processor, an RSU, and an antenna. The RSU includes a transmitter and a read/write controller.

Specifically, the roadside V2X module 101c broadcasts the processed information to vehicles equipped with the V2X receiving device that are passing and/or going to enter the road. The vehicle-mounted control system 102b fuses the data information with the vehicle-acquired information to plan the driving route. Because the roadside V2X module 101c sends information to vehicles in a broadcasting communication mode, it cannot provide a personalized service in time according to requirements of each customer and time. As an alternative solution, the roadside V2X module 101c sends, in a multicast communication mode, the processed information to vehicles equipped with V2X receiving devices that are passing and/or going to enter the road. In this solution, the roadside V2X module 101c only duplicates required data and forwards the required data to vehicles with demand. In this way, data can be transmitted to multiple vehicles with demand through one transmission process, while vehicles without demand are not affected.

With the development of the 5G technology, the road ambient environment sensing system 101 may send in advance, through base stations and RSUs, the vehicle driving assistance information to vehicles installed with vehicle-mounted V2X modules, thereby expanding sensing ranges of the vehicles. In the prior art, a vehicle with a higher configuration has a sensing range of about 100 m, and after the vehicle receives the vehicle driving assistance information of the road ambient environment sensing system 101, the sensing range of the vehicle may expand to about 300 m. Moreover, vehicles with different configurations receive the same vehicle driving assistance information. Therefore, the implementation of the present invention further reduces requirements on hardware configurations of vehicles.

Figure 3:
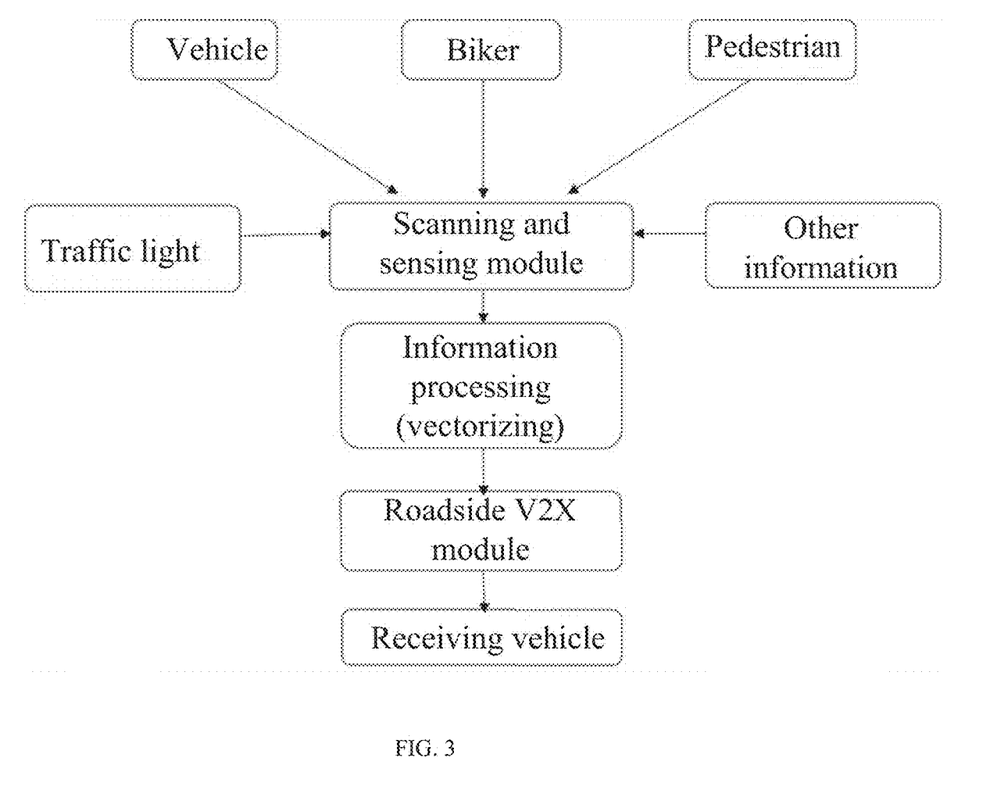
FIG. 3 is a schematic architecture diagram of a road ambient environment sensing system according to an embodiment of the present invention.
Figure 4:
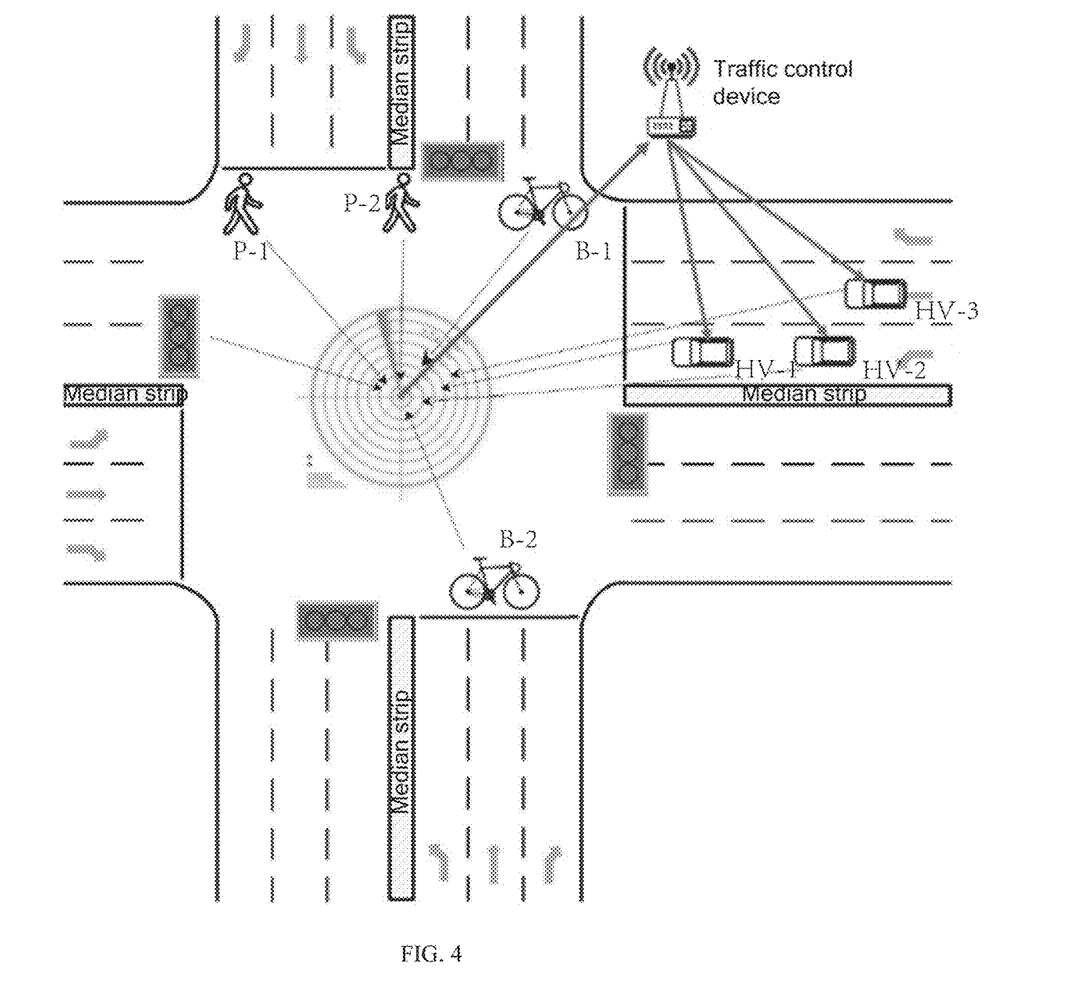
FIG. 4 is a schematic diagram of an operating principle of a safe passing system for a vehicle according to an embodiment of the present invention.

FIG. 3 is a schematic architecture diagram of a road ambient environment sensing system according to an embodiment of the present invention. FIG. 4 is a schematic diagram of an operating principle of a safe passing system for a vehicle according to an embodiment of the present invention. As shown in FIG. 3 and FIG. 4, a scanning and sensing module 101a scans a road ambient environment, to obtain pedestrians P-1 and P-2, bikers B-1 and B-2, vehicles HV-1, HV-2, and HV-3, fixed road conditions, traffic light signals, and the like. After receiving such information, the data processing module 101b processes the information, for example, vectorizing speed information and predicting a motion track. Then, the data obtained after processing is sent to a roadside V2X device. The roadside V2X device sends the information to the vehicles HV-1, HV-2, and HV-3 nearby.

To be specific, communication between the scanning device and the traffic control device, and communication between the traffic control device and the roadside V2X device may be wired transmission or wireless transmission, while low latency needs to be ensured. Optionally, the data processing module 101b is independent and separate from the scanning and sensing module 101a and the roadside V2X module 101c. Optionally, the data processing module 101b is integrated on the roadside V2X module 101c; optionally, the data processing module 101b is integrated on the scanning and sensing module 101a.

It needs to be ensured that the data processing module 101b processes the sensing information in real time. If the technology permits, cloud computing may be introduced, to accelerate data processing. If a cloud server is introduced, the data processing module 101b is further configured to send a data processing request to the cloud server, and receive the vehicle driving assistance information fed back by the cloud server. The cloud server is configured to receive the data processing request sent by the data processing module 101b, process the sensing information according to the data processing request to obtain the vehicle driving assistance information, and feed the vehicle driving assistance information back to the data processing module 101b.

Figure 5:
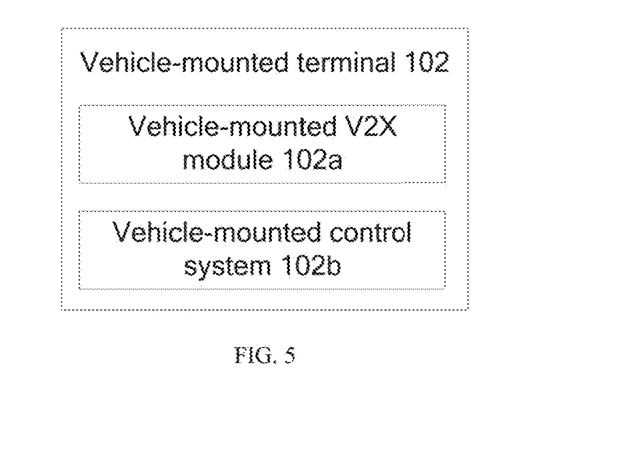
FIG. 5 is a structural block diagram of a vehicle-mounted terminal according to an embodiment of the present invention.

FIG. 5 is a structural block diagram of a vehicle-mounted terminal according to an embodiment of the present invention. As shown in FIG. 5, the vehicle-mounted terminal 102 includes:

a vehicle-mounted V2X module 102a, configured to receive the vehicle driving assistance information and send the vehicle driving assistance information to a vehicle-mounted control system 102b, where the vehicle-mounted V2X module includes an OBU, a processor, and an antenna, and the OBU includes a microprocessor, a non-volatile memory, and a radio frequency front-end; and the vehicle-mounted control system 102b, including a communication unit, one or more processors, a memory, and one or more computer programs, where the communication unit is configured to receive the vehicle driving assistance information and the vehicle-acquired information, and the one or more computer programs, stored in the memory and configured to be executed by the one or more processors, are configured to plan the driving route according to the vehicle driving assistance information and the vehicle-acquired information.

To be specific, the vehicle driving assistance information includes attribute information and vector information of traffic elements, and the vector information includes a speed, an acceleration, and a predicted motion track. After the vehicle-mounted V2X module 102a receives the vehicle driving assistance information, the vehicle-mounted control system 102b adjusts a state of the vehicle according to the vehicle driving assistance information, for example, braking, starting a traversal control function of the vehicle, or starting a longitudinal control function of the vehicle, to avoid collision with an obstacle (pedestrian, motor vehicle, non-motor vehicle, or other objects).

To be specific, the vehicle driving assistance information further includes information such as a three-dimensional location and real-time data. The real-time data includes a traffic signal as well as a flow rate, a speed and density of a traffic flow. After the vehicle-mounted V2X module 102a receives the vehicle driving assistance information, the vehicle-mounted control system 102b adjusts the speed of the vehicle according to the vehicle driving assistance information, so that the driving speed falls within a green wave speed interval, thus reducing a queuing and waiting time at crossroads.

To be specific, the vehicle driving assistance information further includes road traffic status information. The road traffic status information includes a traffic congestion degree of a road/crossroad where the vehicle is located, and basic information and a congestion degree of other routes nearby in a road network. After the vehicle-mounted V2X module 102a receives the vehicle driving assistance information, a driver and/or a navigation system of the vehicle plans the driving route according to the vehicle driving assistance information.

The present invention achieves the following beneficial effects:

1. In the present invention, objects obtained by scanning not only include traffic participants equipped with V2X devices, but also include traffic participants without V2X devices, such as pedestrians, bikers, road obstacles, road conditions, traffic lights and other traffic elements. The obtained sensing information of the road environment covers comprehensive content. The data has higher usability and can provide sufficient environment information of roads nearby for vehicles having V2X receiving apparatuses, so that routes are planned more safely, thereby fully protecting the right of way and safety of vulnerable road users (VRU).

2. One or more types of acquisition devices are used in the present invention, so that a suitable acquisition device can be selected according to a scanning range. Moreover, multiple types of acquisition devices may be used simultaneously to obtain traffic information of a real-time road environment in a larger range. Big data obtained by scanning in the present invention is real and accurate, and has low latency. The whole system is more robust, safer, and more reliable.

3. In the present invention, vehicles having V2X receiving apparatuses can receive environment information of roads nearby sent by the road ambient environment sensing system, thereby reducing the configuration requirement on built-in acquisition apparatuses of the vehicles.

Embodiment 2

Figure 6:
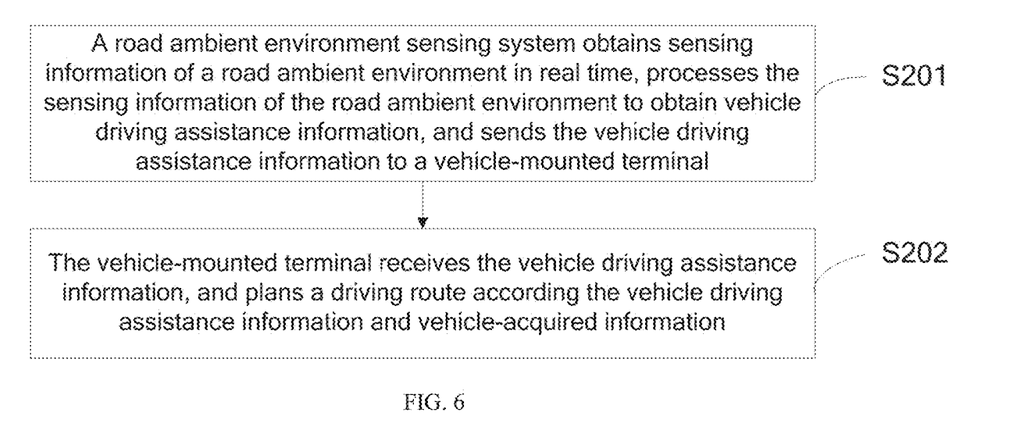
FIG. 6 is a flowchart of a safe passing method for a vehicle according to an embodiment of the present invention.

FIG. 6 is a flowchart of a safe passing method for a vehicle according to an embodiment of the present invention. As shown in FIG. 6, a safe passing method for a vehicle based on the safe passing system for a vehicle in Embodiment 1 includes the following steps:

S201: a road ambient environment sensing system obtains sensing information of a road ambient environment in real time, processes the sensing information of the road ambient environment to obtain vehicle driving assistance information, and sends the vehicle driving assistance information to a vehicle-mounted terminal.

S202: the vehicle-mounted terminal receives the vehicle driving assistance information, and plans a driving route according the vehicle driving assistance information and vehicle-acquired information.

Specifically, step S201, namely, a road ambient environment sensing system obtains sensing information of a road ambient environment in real time, processes the sensing information of the road ambient environment to obtain vehicle driving assistance information, and sends the vehicle driving assistance information to a vehicle-mounted terminal, includes the following sub-steps:

a scanning and sensing module scans the road ambient environment by using one or more types of scanning devices, and sends the sensing information obtained through scanning to a data processing module, where the scanning and sensing module includes one or more types of scanning devices and a wireless communication module, the scanning device is connected to the wireless communication module through communication, and the wireless communication module is connected to the data processing module through wireless communication; the scanning device is selected from the group consisting of a laser radar, an over-the-horizon radar, a microwave radar, a millimeter-wave radar, an infrared device, a camera and combinations thereof; the wireless communication module includes one or more of a WIFI transmission module, a Bluetooth transmission module, a Zigbee transmission module, or an RF transmission module;

the data processing module processes the sensing information to obtain the vehicle driving assistance information, and sends the vehicle driving assistance information to a roadside V2X module, where the data processing module includes a wireless communication module and a processor; the wireless transmission module includes one or more of a WIFI transmission module, a Bluetooth transmission module, a Zigbee transmission module, or an RF transmission module; and the processor may be one or more of a central processing unit, a microprocessor, a single-chip microprocessor or a microcomputer; and the roadside V2X module sends the vehicle driving assistance information to a vehicle-mounted terminal on a vehicle that is passing and/or is going to run through the current road, where the roadside V2X module includes a sensor, a processor, an RSU, and an antenna; and the RSU includes a transmitter and a read/write controller.

Specifically, many other steps, apparatuses and processes may also be used herein. For example, the processing, by the data processing module, the sensing information to obtain the vehicle driving assistance information further includes:

sending, by the data processing module, a data processing request to a cloud server;

receiving, by the cloud server, the data processing request sent by the data processing module, processing the sensing information according to the data processing request to obtain the vehicle driving assistance information, and feeding the vehicle driving assistance information back to the data processing module; and receiving, by the data processing module, the vehicle driving assistance information fed back by the cloud server.

Specifically, step S202, that is, the vehicle-mounted terminal receives the vehicle driving assistance information, and plans a driving route according the vehicle driving assistance information and vehicle-acquired information, includes the following sub-steps:

a vehicle-mounted V2X module receives the vehicle driving assistance information and sends the vehicle driving assistance information to a vehicle-mounted control system, where the vehicle-mounted V2X module includes an OBU, a processor, and an antenna, and the OBU includes a microprocessor, a non-volatile memory, and a radio frequency front-end; and the vehicle-mounted control system plans the driving route according to the vehicle driving assistance information and the vehicle-acquired information, where the vehicle-mounted control system includes a communication unit, one or more processors, a memory, and one or more computer programs, the communication unit is configured to receive the vehicle driving assistance information and the vehicle-acquired information, and the one or more computer programs, stored in the memory and configured to be executed by the one or more processors, are configured to plan the driving route according to the vehicle driving assistance information and the vehicle-acquired information.

The present invention further provides a non-transitory computer-readable storage medium, wherein the computer-readable storage medium is used to store executable instructions, which can be loaded and executed by a processor to implement the safe passing method for a vehicle.

Optionally, in this embodiment, the storage medium may be located in at least one of a plurality of network servers in a computer network. Optionally, in this embodiment, the storage medium may include, but is not limited to: a USB flash disk, a read-only memory (ROM), a random access memory (RAM), a mobile hard disk, a magnetic disk, an optical disk, or other media capable of storing program codes.

The present invention achieves the following beneficial effects:

1. In the present invention, objects obtained by scanning not only include traffic participants equipped with V2X devices, but also include traffic participants without V2X devices, such as pedestrians, bikers, road obstacles, road conditions, traffic lights and other traffic elements. The obtained sensing information of the road environment covers comprehensive content. The data has higher usability and can provide sufficient environment information of roads nearby for vehicles having V2X receiving apparatuses, so that routes are planned more safely, thereby fully protecting the right of way and safety of VRU.

2. One or more types of acquisition devices are used in the present invention, so that a suitable acquisition device can be selected according to a scanning range. Moreover, multiple types of acquisition devices may be used simultaneously to obtain traffic information of a real-time road environment in a larger range. Big data obtained by scanning in the present invention is real and accurate, and has low latency. The whole system is more robust, safer, and more reliable.

3. In the present invention, vehicles having V2X receiving apparatuses can receive environment information of roads nearby sent by the road ambient environment sensing system, thereby reducing the configuration requirement on built-in acquisition apparatuses of the vehicles.

Described herein is the operation of sending the obtained vehicle driving assistance information to a vehicle. However, the vehicle driving assistance information generated by the safe passing system/method for a vehicle provided herein may also be sent to other pedestrians, bikers and the like having V2X receiving modules, to achieve any objectives, for example, guide for the blind, unmanned driving, and many other objectives.

A person skilled in the art may further understand that various illustrative logical blocks, units and steps listed in the embodiments of the present invention may be implemented by electronic hardware, computer software, or a combination of the two. To present the interchangeability between hardware and software clearly, functions of various illustrative components, units, and steps above have been described generally. Whether such functions are implemented by hardware or software depends on the specific application and the design requirement of the entire system. A person skilled in the art may use various methods to implement the described functions for each specific application, but such implementation should not be considered to be beyond the protection scope of the embodiments of the present invention.

Various illustrative logical blocks and units described in the embodiments of the present invention may implement or operate the described functions by using a general-purpose processor, a digital signal processor, an application-specific integrated circuit (ASIC), a field-programmable gate array (FPGA) or other programmable logical apparatuses, a discrete gate or transistor logic, a discrete hardware component, or a design of a combination of any of the foregoing items. A general-purpose processor may be a microprocessor. Optionally, the general-purpose processor may be any conventional processor, controller, microcontroller, or state machine. The processor may alternatively be implemented by a combination of computing apparatuses, for example, a digital signal processor and a microprocessor, a plurality of microprocessors, one or more microprocessors in conjunction with one digital signal processor core, or any other similar configuration.

The steps of the method or algorithm described in the embodiments of the present invention may be directly embedded in hardware, in a software module executed by a processor, or in a combination of both. The software module may be stored in a RAM, a flash memory, a ROM, an EPROM, an EEPROM, a register, a hard disk, a removable magnetic disk, a CD-ROM, or any other form of storage medium known in the art. For example, the storage medium may be connected to the processor, so that the processor can read information from the storage medium and write information into the storage medium. Optionally, the storage medium may be integrated in the processor. The processor and the storage medium may be disposed in an ASIC, and the ASIC may be disposed in a user terminal. Optionally, the processor and the storage medium may be disposed in different components of the user terminal.

In one or more exemplary designs, the foregoing functions described in the embodiments of the present invention may be implemented in hardware, software, firmware, or any combination of the three. If implemented in software, the functions may be stored in a computer readable medium, or transmitted over the computer readable medium in the form of one or more instructions or code. The computer readable medium includes a computer storage medium and a communication medium that facilitates transfer of a computer program from one place to another. The storage medium may be an available medium accessible to a general-purpose or special-purpose computer. For example, such a computer readable medium may include, but is not limited to, a RAM, a ROM, a CD-ROM or other optical disc storage, magnetic disk storage or other magnetic storage apparatuses, or any other medium capable of carrying or storing program code in the form of instructions or data structures or in other forms that can be read by a general-purpose or special-purpose computer or by a general-purpose or special-purpose processor. In addition, any connection may be properly defined as a computer readable medium. If software is transmitted from a website, a server or other remote resources through a coaxial cable, a fiber-optic cable, a twisted pair, or a digital subscriber line (DSL) or transmitted in a wireless manner such as infrared, radio frequency, or microwave, the software is also contained in the defined computer readable medium. The disk and disc include a compact disk, a laser disc, an optical disc, a DVD, a floppy disk, and a blue-ray disc. The disk generally duplicates data magnetically, while the disc generally duplicates data optically through laser. A combination of the above may also be contained in the computer readable medium.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, improvement, or the like made within the spirit and principle of the present invention shall fall within the protection scope of the present invention.

The invention claimed is:

1. A safe passing system for a vehicle, comprising:
a road ambient environment sensing system, configured to obtain sensing information of a road ambient environment in real time, process the sensing information to obtain vehicle driving assistance information, and send the vehicle driving assistance information to a vehicle-mounted terminal; and
the vehicle-mounted terminal, configured to receive the vehicle driving assistance information, and plan a driving route according to the vehicle driving assistance information and vehicle-acquired information;
wherein the road ambient environment sensing system comprises:
a scanning and sensing module, configured to scan the road ambient environment by using one or more types of scanning devices, and send the sensing information obtained through scanning to a data processing module;
the data processing module, configured to process the sensing information to obtain the vehicle driving assistance information, and send the vehicle driving assistance information to a roadside Vehicle-to-Everything (V2X) module; and
the roadside V2X module, configured to send the vehicle driving assistance information in a multicast communication mode to the vehicle-mounted terminal on a vehicle that is passing or is going to run through the current road;
wherein the data processing module comprises a data fusion module, the data fusion module is configured to perform different levels of related processing on the sensing information obtained through scanning using multiple scanning devices or multiple types of scanning devices.

2. The safe passing system for a vehicle according to claim 1, wherein the data processing module is integrated on the roadside V2X module or the scanning and sensing module.

3. The safe passing system for a vehicle according to claim 1, wherein the scanning device is selected from the group consisting of a laser radar, an over-the-horizon radar, a microwave radar, a millimeter-wave radar, an infrared device, a camera and combinations thereof; and the scanning device is mounted on one or more of a signal light stand, a street light pole, a traffic sign stand, a billboard stand, and a roadside building.

4. The safe passing system for a vehicle according to claim 1, further comprising a cloud server, wherein
the data processing module is further configured to send a data processing request to the cloud server, and receive the vehicle driving assistance information fed back by the cloud server; and
the cloud server is configured to receive the data processing request sent by the data processing module, process the sensing information according to the data processing request to obtain the vehicle driving assistance information, and feed the vehicle driving assistance information back to the data processing module.

5. The safe passing system for a vehicle according to claim 1, wherein the vehicle-mounted terminal comprises:
a vehicle-mounted Vehicle-to-Everything (V2X) module, configured to receive the vehicle driving assistance information and send the vehicle driving assistance information to a vehicle-mounted control system; and
the vehicle-mounted control system, configured to plan the driving route according to the vehicle driving assistance information and the vehicle-acquired information.

6. The safe passing system for a vehicle according to claim 1, wherein
the road ambient environment comprises all perceivable traffic elements that affect road traffic safety, and the traffic elements comprise pedestrians, vehicles, roads, road ancillary facilities and obstacles; and
the vehicle driving assistance information comprises attribute information and vector information of the traffic elements, and the vector information comprises a speed, an acceleration, and a predicted motion track.

7. A safe passing method for a vehicle, comprising:
obtaining, by a road ambient environment sensing system, sensing information of a road ambient environment in real time, processing the sensing information of the road ambient environment to obtain vehicle driving assistance information, and sending the vehicle driving assistance information to a vehicle-mounted terminal; and
receiving, by the vehicle-mounted terminal, the vehicle driving assistance information, and planning a driving route according to the vehicle driving assistance information and vehicle-acquired information;
wherein the obtaining, by the road ambient environment sensing system, sensing information of the road ambient environment in real time, processing the sensing information of the road ambient environment to obtain vehicle driving assistance information, and sending the vehicle driving assistance information to the vehicle-mounted terminal comprises:
scanning, by a scanning and sensing module, the road ambient environment by using one or more types of scanning devices, and sending the sensing information obtained through scanning to a data processing module;
processing, by the data processing module, the sensing information to obtain the vehicle driving assistance information, and sending the vehicle driving assistance information to a roadside Vehicle-to-Everything (V2X) module; and
sending, by the roadside V2X module, the vehicle driving assistance information in a multicast communication mode to the vehicle-mounted terminal on a vehicle that is passing or is going to run through the current road;
wherein processing, by the data processing module, the sensing information to obtain the vehicle driving assistance information comprises: performing, by a data fusion module, different levels of related processing on the sensing information obtained through scanning using multiple scanning devices or multiple types of scanning devices.

8. The safe passing method for a vehicle according to claim 7, wherein the processing, by the data processing module, the sensing information to obtain the vehicle driving assistance information comprises:
sending, by the data processing module, a data processing request to a cloud server;
receiving, by the cloud server, the data processing request sent by the data processing module, processing the sensing information according to the data processing request to obtain the vehicle driving assistance information, and feeding the vehicle driving assistance information back to the data processing module; and
receiving, by the data processing module, the vehicle driving assistance information fed back by the cloud server.

9. The safe passing method for a vehicle according to claim 7, wherein the receiving, by the vehicle-mounted terminal, the vehicle driving assistance information, and planning a driving route according to the vehicle driving assistance information and vehicle-acquired information comprises:
receiving, by a vehicle-mounted Vehicle-to-Everything (V2X) module, the vehicle driving assistance information and sending the vehicle driving assistance information to a vehicle-mounted control system; and
planning, by the vehicle-mounted control system, the driving route according to the vehicle driving assistance information and the vehicle-acquired information.

10. A non-transitory computer-readable storage medium, wherein the computer-readable storage medium is used to store executable instructions, which can be loaded and executed by a processor to implement the safe passing method for a vehicle according to claim 7.

* * * * *